United States Patent
Shen et al.

(10) Patent No.: US 12,099,646 B2
(45) Date of Patent: Sep. 24, 2024

(54) PROSPECTIVE GENERATION AND STORAGE OF CONTENT FOR AN ALTERNATE REALITY ENVIRONMENT

(71) Applicant: Seagate Technology, LLC, Fremont, CA (US)

(72) Inventors: Jin Quan Shen, Sengkang (SG); Xiong Liu, Bukit Timah (SG); Choon Wei Ng, Toa Payoh (SG); Abhay T Kataria, Longmont, CO (US)

(73) Assignee: Seagate Technology LLC, Fremont, CA (US)

( * ) Notice: Subject to any disclaimer, the term of this patent is extended or adjusted under 35 U.S.C. 154(b) by 166 days.

(21) Appl. No.: 17/836,340

(22) Filed: Jun. 9, 2022

(65) Prior Publication Data

US 2023/0400910 A1 Dec. 14, 2023

(51) Int. Cl.
*G06F 3/01* (2006.01)
*G06F 3/04815* (2022.01)
*G06T 19/00* (2011.01)

(52) U.S. Cl.
CPC .......... *G06F 3/011* (2013.01); *G06F 3/04815* (2013.01); *G06T 19/006* (2013.01)

(58) Field of Classification Search
CPC ...... G06F 3/01; G06F 3/0481; G06F 3/04815; G06T 19/00
See application file for complete search history.

(56) References Cited

U.S. PATENT DOCUMENTS

| | | |
|---|---|---|
| 9,330,501 B2 | 5/2016 | Sahoo et al. |
| 10,769,438 B2 | 9/2020 | Bendale et al. |
| 11,024,088 B2 | 6/2021 | Heinen et al. |
| 2015/0097719 A1 | 4/2015 | Balachandreswaran et al. |
| 2016/0300392 A1 | 10/2016 | Jonezyk et al. |
| 2018/0247453 A1* | 8/2018 | Nakashima ............... G09G 5/00 |
| 2018/0316947 A1 | 11/2018 | Todd |
| 2018/0321806 A1* | 11/2018 | Rodriguez Virgen ....... H04L 51/046 |
| 2020/0384359 A1* | 12/2020 | Brown ..................... A63F 13/71 |
| 2022/0266133 A1* | 8/2022 | Mawdesley ......... G07F 17/3225 |

FOREIGN PATENT DOCUMENTS

WO WO-2022137519 A1 * 6/2022

* cited by examiner

*Primary Examiner* — Weiming He
(74) *Attorney, Agent, or Firm* — Hall Estill Law Firm (57) ABSTRACT

An alternate reality, such as virtual reality or augmented reality, environment can experience optimized performance with a data system arranged with an interaction device connected to a virtual reality assembly. Base content and user content can respectively be downloaded and stored to a local data storage of the virtual reality assembly. The content may be utilized to proactively generate comprehensive content that consists of merged aspects of the base content and the user content. The comprehensive content can then be executed to create an immersive digital reality conveyed to a user via the interaction device.

14 Claims, 5 Drawing Sheets

PROSPECTIVE GENERATION AND STORAGE OF CONTENT FOR AN ALTERNATE REALITY ENVIRONMENT

SUMMARY

A data system, in accordance with some embodiments, can be configured for an alternate reality operation with optimized utilization of available computing resources.

In accordance with some embodiments, a data system has an interaction device connected to a virtual reality assembly. Base content and user content is respectively downloaded and stored to a local data storage of the virtual reality assembly. The content is utilized to proactively generate comprehensive content that consists of merged aspects of the base content and the user content. The comprehensive content is then be executed to create an immersive digital reality conveyed to a user via the interaction device.

Various embodiments of a data system optimize performance of an alternate reality by connecting a first virtual reality assembly to a second virtual reality assembly with each assembly connected to separate interaction devices respectively worn by a first user and a second user. Each virtual reality assembly downloads base content to local data storage and stores user content for the respective users to the respective local data storage. Each user content is a unique digital representation of a user. A virtual reality assembly proactively creates comprehensive content consisting of merged aspects of the base content and each user content stored in the local data storage of the virtual reality assembly. The virtual reality assembly then executes the comprehensive content to create an immersive digital reality conveyed to a first user via the interaction device connected to the virtual reality assembly.

DETAILED DESCRIPTION

Generally, embodiments of a data system are directed to hardware and software configurations to optimization performance, reliability, and quality of alternate reality environments, such as virtual reality and augmented reality.

As computing systems have evolved and become more sophisticated, alternate reality environments have become more expansive, real, and immersive. For instance, virtual reality where users engage one or more sense capacity, such as sight, sound, or touch, in an artificial, digital environment can provide robust realism and interactive opportunities due to the computing power of various aspects of hardware utilized by a user. As another example, an augmented reality environment where digital content is concurrently provided to a user with actual reality, such as through glasses, headphones, or haptic interactive mechanisms, can provide interesting combinations of digital and actual content to convey unique experiences to a user.

While immersive virtual or augmented reality environments have grown with the evolution of computing capabilities and form factors, such environments have be isolated from others and inefficient in incorporating multiple users in a single environment. For instance, advancements in computing allows local gaming consoles to provide multi-player interaction with software that does not provide an immersive virtual or augmented reality environment while truly immersive environments restrict inclusion of multiple different users to preserve bandwidth and computing resources to adapt to a user's behavior. As such, there is an existing goal to make immersive environments more conducive to concurrently incorporating multiple different users.

Accordingly, assorted embodiments of a data system are directed to utilizing local data storage and intelligent handling of online and offline data to provide efficient adaptations of an immersive environment for multiple different users.

As explained below, some embodiments include an interaction device connected to a virtual reality (VR) assembly. The interaction device is configured to be physically engaged by a human user and includes a sensor configured to detect an input from the human user and a display element configured to convey an output to the human user. The VR assembly has a controller circuit and a local data storage device. Base content and user content are downloaded to the local data storage device. First and second comprehensive data are proactively generated and stored based on predicted motion information associated with an object or a participant. Thereafter, upon receipt of a message token identifying actual motion information associated with the object or the participant, the first comprehensive content is executed to create an immersive digital reality that is conveyed to the human user via the interaction device responsive to the message token. The immersive digital reality incorporates the motion information from the first token, and the second comprehensive content remains unused in the immersive digital reality.

With the ability to intelligently handle digital content and proactively generate content for future use, an alternate reality environment can efficiently provide an immersive world for various users with minimal lag and/or delay.

Figure 1:
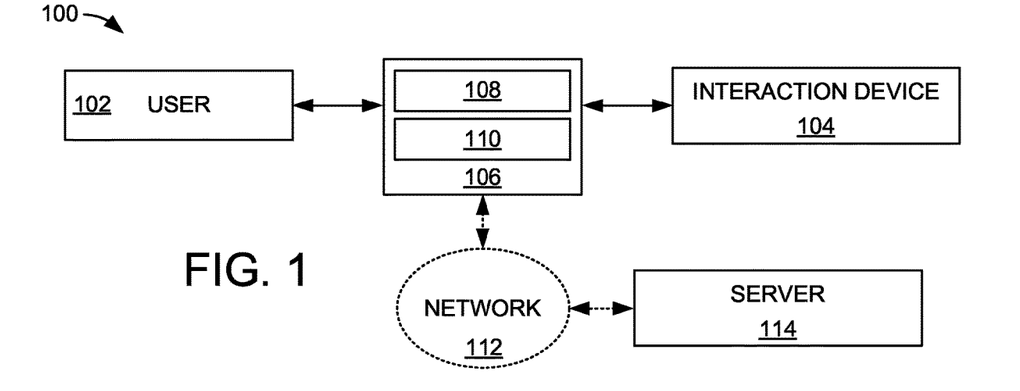
FIG. 1 displays a block representation of an example computing environment in which various embodiments may be practiced.

FIG. 1 depicts a block representation of an example computing environment 100 in which various embodiments can be practiced. The environment 100 can engage any number of users 102 with one or more interaction devices 104 that convey digital content, such as visual, audible, and haptic content. Such digital content can be generated and/or conveyed through a computing device 106 that employs at least a processor 108, such as a microcontroller or other programmable circuitry, and a memory 110, such as a non-volatile and/or volatile data storage apparatus. For instance, the computing device 106 can alter input from one or more users 102 into digital content of an immersive virtual or augmented reality environment that is conveyed back to the user 102 through the interaction device 104.

It is contemplated that the computing device 106 is a stand-alone unit, such as a gaming console, that lacks a link to a network 112 or that connects to other computing components, such as a remote server 114. Some embodiments utilize wired and/or wireless signal pathways of a network 112 to provide interaction between the local computing device 106 and other devices that allow multi-player interaction with a software. However, it is noted that existing systems that utilize remote connections of computing components provide less immersive user environments that require far less data, processing, and interconnection bandwidth than virtual reality and augmented reality environments. That is, current gaming systems, even if interconnected via a network are not sophisticated enough to generate, transfer, and display sufficient digital content to provide a seamless, no-lag immersive alternate reality environment.

Figure 2:
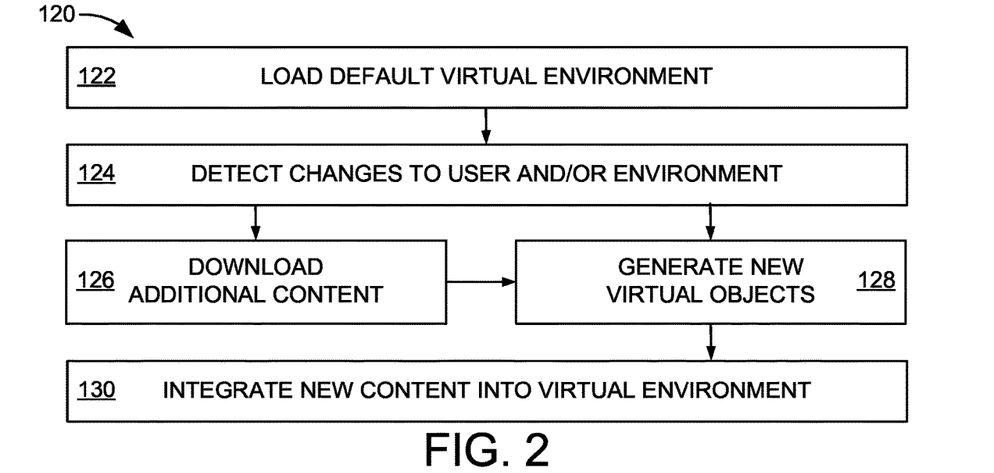
FIG. 2 depicts example operation of a data system that can be utilized in the computing environment of FIG. 1 in some embodiments.

FIG. 2 conveys a process 120 that can be conducted on the example computing system of FIG. 1 to provide an immersive virtual/augmented reality environment. With at least one computing device executing a pre-loaded alternate reality software, step 122 can employ the computing device processor to load a default virtual environment that may, or may not, be customized to the preferences and/or unique content of the user(s).

As a user engages with the virtual environment, which may be an augmented reality environment is some embodiments, step 124 detects changes that are to be implemented into the environment. For instance, movement of the user can prompt changes to the short-field, long-field, and horizon aspects of the environment conveyed by a interaction device. It is noted that the implementation of additional users to an environment can further prompt changes to the digital avatar of a user, the surroundings, and interactions among digital content.

While it is contemplated that all dynamic aspects of an alternate reality can be present in data storage of a local device without connection to a remote server 114, various embodiments download digital content to enable dynamic aspects of a user and/or digital reality environment in step 126 from a remote data source via one or more network pathways. As an example, as a user moves in real life, a computing device can download digital content from one or more network connected nodes associated with showing, hearing, and feeling that movement in a digital reality environment.

Various embodiments of dynamic digital content task a computing device with generating and/or updating one or more virtual objects in step 128. Such content creation in step 128 can occur in response to existing digital content and/or newly downloaded content. The utilization of new virtual objects in step 128 allows a computing device to then implement the content into the digital environment in step 130 to provide a seamless immersive alternate reality that reacts realistically to actions of a user. It is noted that generation of new content is not required for step 130 and actual downloaded content from 126 can be integrated into an environment, unaltered.

The on-demand downloading and/or creation of digital content in process 120 can provide a level of service and quality for a maintained alternate reality environment, particularly with a single user experiencing the assorted aspects of the environment. Yet, the reactive population of dynamic aspects of a digital reality can limit the resolution, scope, depth, color, richness, and/or clarity of objects displayed to a user due to the bandwidth and processing capabilities of the computing device conducting steps 126, 128, and 130. Indeed, the next generation of alternate reality platform, such as a Meta universe, Fortnite, Roblox, Minecraft, or Steam, will demand substantially greater volumes of data that provide more robust digital environments and more life-like reactions to user movement and/or interactions with other digital users of an environment. It is contemplated that the purely reactive adaptations of digital environment in process 120 are insufficient to supply such next-generation alternate reality platforms, even with advancements in the computing capabilities of virtual/augmented reality hardware components.

Figure 3:
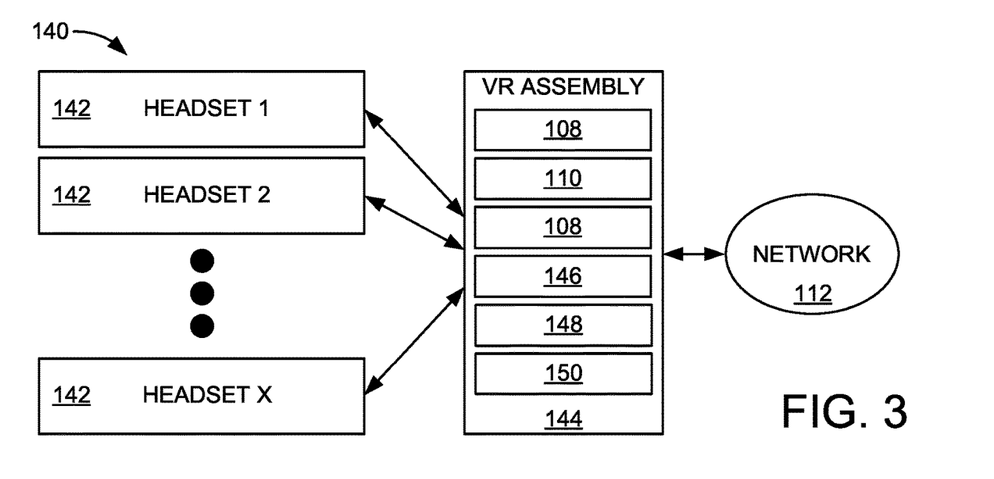
FIG. 3 illustrate a block representation of portions of an example data system configured in accordance with various embodiments.

For these reasons, embodiments are directed to an alternate reality hardware system that handles data and digital content in a manner that allows for more comprehensive, immersive, and diverse environment that seamlessly reacts to actions of multiple different users in very life-like manners. FIG. 3 depicts a block representation of portions of an example data system 140 that can provide optimized alternate reality maintenance over time for multiple different users. The system 140 connects any number of headsets 142 to a central virtual reality (VR) assembly 144 via wired and/or wireless signal pathways that allow continued communication that delivers digital content to the respective headsets 142 as well as information sensed from a headset 142 to the VR assembly 144.

Although not required or limiting, the VR assembly 144 can have a main processor 108 and memory 110 that operate with a content controller 146, data storage device 148, and buffer 150 to intelligently handle various amounts of data to, and from, the respective headsets 142. It is noted that any one of the connected headsets 142 can have one or more sensors, detectors, processors, and memories that can generate, process, and/or store data. For instance, a headset 142 can concurrently, or sequentially, measure several different parameters, such as acceleration, movement, loudness, direction, and pressure, that are temporarily stored in local memory before being transferred to the central VR assembly 144 for use in adapting the content conveyed to a user by the headset 142. It is contemplated that processing capabilities of a headset 142 can be employed to transform data prior to being sent to the VR assembly 144, such as compression or encryption, which can free processing resources of the VR assembly 144 for other system 140 tasks.

The ability to conduct computing activity, such as data processing, storage, and transmission, allows each headset 142 to concurrently execute software to establish and maintain an alternate digital reality over time. The separate execution of common, or dissimilar, software by the respective headsets 142 of the system 140 can provide one or more digital environments. That is, headset 142 processing and software execution can concurrently provide separate digital environments/realities or a single environment that all headset 142 users are simultaneously engaging.

The use of a dedicated content controller 146 in conjunction with a main processor 108 allows the VR assembly 144 to intelligently handle data received from a remote source, via the network 112, and/or from the respective headsets 142. Some embodiments of the VR assembly 144 utilize the content controller 146 to generate new data from other data stored in the memory 110, buffer 150, and/or data storage device 148. Such dedicated digital content processing by the content controller 146 can allow the main processor 108 to conduct various system 140 activities while providing increased resource availability, which can translate into greater system 140 responsiveness, efficiency, and adaptations to changes, such as connection of new headsets 142 or low network 112 bandwidth.

Figure 4:
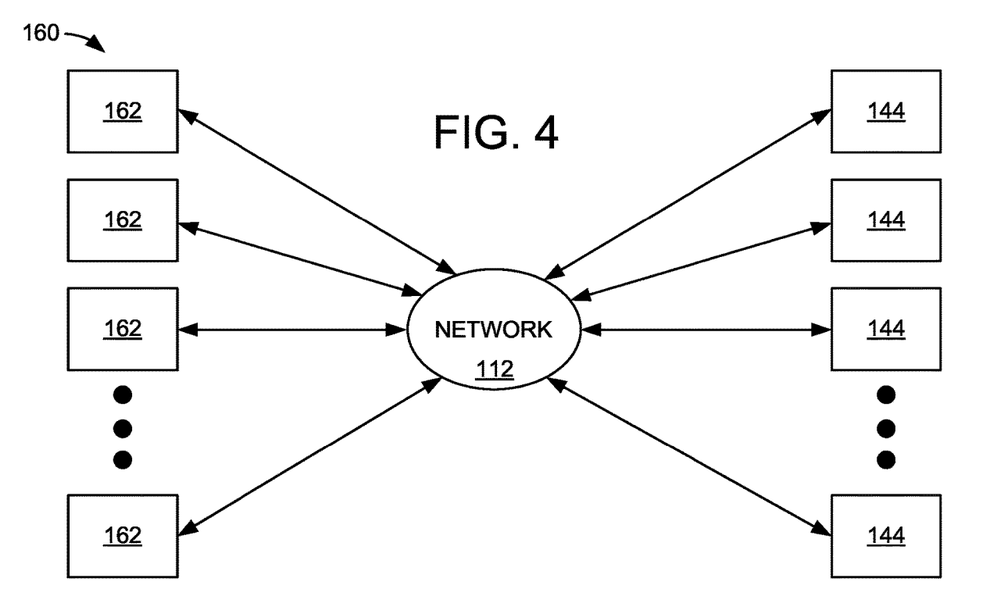
FIG. 4 conveys a block representation of portions of an example data system in which embodiments can be carried out.

FIG. 4 depicts a block representation of an example data system 160 that can carry out assorted embodiments to provide intelligent data handling for one or more alternate digital environments. The non-limiting system 160 is configured with a centralized network 112 concurrently providing signal pathways between any number of content providers 162 with any number of VR assemblies 144. A content provider 162 is not restricted to a particular type, location, or duration, but in some embodiments is a remote database that can be selectively accessed by a VR assembly 144 for particular digital content, such as images, video, textures, or animations. For example, one content provider 162 may supply artwork while another content provider 162 supplies graphics corresponding with movement of a user in an alternate, digital reality.

Regardless of the size, duration, and type of content accessed from the content providers 162, the respective VR assemblies 144 can download a predetermined volume of digital data that is stored locally in a memory 110, buffer 150, and/or data storage device 148. It is contemplated that downloads from the various content providers 162 may correspond with a fee, or may be free of charge. A VR assembly 144, in some embodiments, proactively downloads content from one or more providers 162 to increase the responsiveness to user manipulations of a digital reality, such as movement and interaction. The intelligent identification of what digital content to proactively download from a provider 162 allows a VR assembly 144 to efficiently maintain a local cache of digital content that can provide seamless changes to a digital reality for a user.

It is noted that some digital content can be characterized as base virtual reality content (BVRC) and other digital content can be characterized as participant virtual reality content (PVRC). Some embodiments of an alternate reality data system 160 define BVRC as images and/or video sourced from a content provider 162 and PC as images and/or video generated and stored in a headset and/or VR assembly 144 corresponding to a digital representation of a user in one or more alternate realities. A VR assembly 144 may further create content in the form of digital objects (OVRC) and/or motion information derived from BVRC and/or PC. For instance, a VR assembly 144 can generate images and/or video that relates to participant motion virtual reality content (PMVRC) or images and/or video relating to digital object motion virtual reality content (OMVRC), with an object being defined as a digital item that is not a representation of a reality user.

Embodiments of a VR assembly 144 correlate motion of objects and/or users from data sent to the VR assembly 144 from a headset 142. For instance, motion of a user detected by one or more sensors of a headset 142 can be relayed to a VR assembly 144 in the form of a motion message that allows the processing capabilities of the VR assembly 144 to efficiently generate and execute motion content (PMVRC/OMVRC) that seamlessly translates the sensed motion into accurate alternate, digital reality visual, audible, and haptic information. To clarify, a VR assembly 144 can download data from providers 162, receive data from headsets 142, and generate user-specific digital data to proactively build a database of available digital content that is available for playback in response to a detected, or predicted user trigger, such as user motion, digital object motion, and/or user interaction.

Even though content providers 162 can employ policies that download BVRC efficiently, multiple users engaging a common portion of a digital environment, particularly if movement of the user and/or an object is involved. While local storage of various data can be temporarily or permanently stored locally in a buffer or volatile memory array, reactive downloading and/or accessing of stored data can be limited by the transfer rate of the data storage mechanism. In data storage that has a finite number of data accesses, such as flash or some other solid-state memory, the reactive storage and processing of data can further restrict the ability of a data system to provide a realistic alternate reality environment.

To address these challenges, various embodiments proactively download and/or generate content, such as images and videos, to complement motion specific information for a user and/or object that is reactively derived from a message, which can be characterized as a token, that contains motion information transmitted to the VR assembly 144 from a headset 142. That is, the proactive and reactive generation and/or updating of digital content stored in a VR assembly 144 can result in less data and information that will be needed on-demand to translate user and/or object motion into accurate digital representations, which allows for a more seamless integration of user/object activity into an alternate reality environment.

Figure 5:
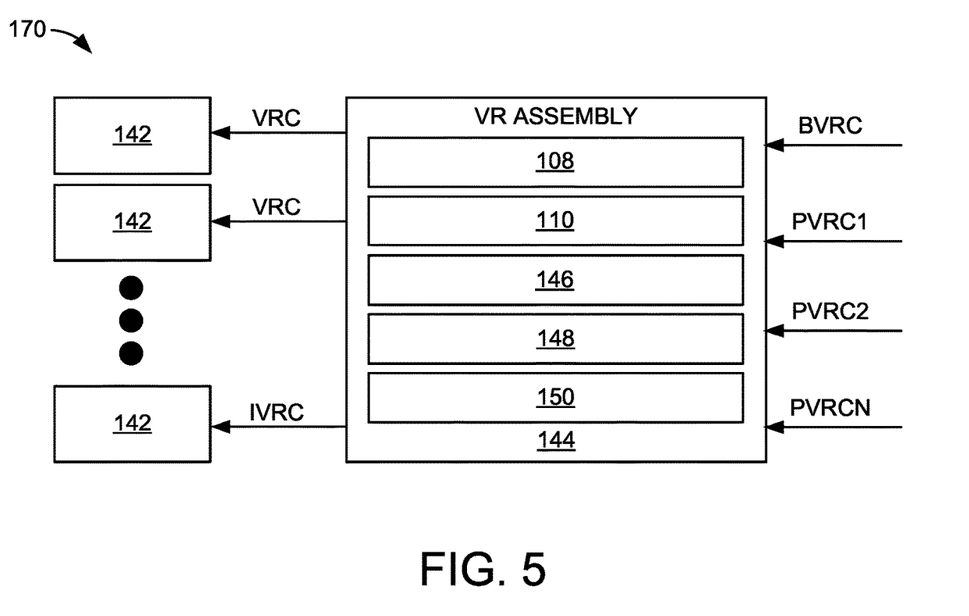
FIG. 5 depicts a block representation of portions of an example data system constructed and operated in accordance with assorted embodiments.

FIG. 5 depicts a block representation of portions of any example data system 170 in which assorted embodiments can be practiced. A VR assembly 144 can input any amount of data/information from any number of local and/or remote sources to generate images and/or video corresponding with combined user, object, and background digital content, which can be characterized as virtual reality content (VRC). It is noted that motion information received from a headset 142 can be used to derive images and/or videos associated with user and/or object movement, which can be characterized as instant virtual reality content (IVRC).

Although the ability for a VR assembly 144 to process, generate, and otherwise handle data can provide a rather sophisticated virtual/augmented reality experience for a user, the relatively large volumes of data associated with motion, shading, texture, and multiple concurrent users of a single digital environment can degrade the realism of a reality over time as lag, delays, and buffering interfere with user's experience. The issues facing a multi-user digital reality can be compounded when volumes of data are not stored locally and are instead downloaded from remote providers, which can delay processing of data in response to low available network/component bandwidth. Accordingly, embodiments are directed to the intelligent handling, processing, and generation of data that mitigates operational challenges by opportunistically utilizing system resources to make content that allows for a realistic digital environment to be provided and maintained over time for multiple separate users.

As shown in the example data system 170 of FIG. 5, a VR assembly 144 can input BVRC that is selectively pre-downloaded from at least one remote content provider and stored in a local data storage device 148, which frees the remaining data storage aspects of the VR assembly 144 for assorted data processing and output operations. The VR assembly 144 can additionally input digital content corresponding to any number (N) of unique users/participants (PVRC1-N) into the local data storage device 148 to allow for subsequent creation of virtual reality content (VRC) that merges at least the base digital content with user-specific digital content.

While not limiting, the processing capabilities of the VR assembly 144, such as the content controller 146 and main processor 108, can be utilized by merging assorted aspects of the BVRC with one or more PVRC, depending on the spatial location of the respective environment users, to create a realistic digital incorporation of the digital representation of the user in the alternate digital reality, which may be a completely virtual reality or augmented reality. Embodiments of the VR assembly 144 carry out a proactive strategy to opportunistically merge various BVRC with PVRC to create a diverse array of VRC in a proactive manner. Such VRC creation allows the VR assembly 144 to quickly access and execute the VRC in response to predetermined operational triggers, such as new user login, environment interaction, or background changes with time.

The merging of base environment content with user/participant content can be particularly processing intensive, and potentially a source for lag and delay, when movement is involved. For instance, adaptation of the virtual surroundings and/or the digital representation of user/participant in an alternate, digital reality can involve merging several different images and/or videos together while preserving a realistic digital environment. As such, the VR assembly 144 can proactively merge various inputted images, video, and other digital content to allow near seamless display of such content when conditions of the digital environment warrant changes. It is noted that the proactive creation of VRC can result in unused digital content that, from a practical perspective, expends system processing resources that are not fruitful. Yet, the increase in responsiveness and reduction in bandwidth needed to support high-quality digital environments may outweigh some superfluous use of processing and data storage capabilities.

With the proactive generation of VRC that is stored in the local data storage device 148, the VR assembly 144 can concurrently provide different VRC for the respective headsets 142. As a result, each headset 142 can partake in a separate digital environment or can simultaneously engage a single digital environment, which can be a virtual reality or augmented reality where headsets 142 experience and interact with common objects, backgrounds, and user avatars. In contrast, reactive generation of VRC by the VR assembly 144 can be plagued with lag, delay, and unrealistic adaptations to a digital environment, particularly with relatively large volumes of BVRC and/or PVRC that correspond with realistic digital images, video, graphics, motion, and avatars. Hence, the intelligent utilization of assembly 144 resources to proactively generate a diverse variety of VRC that could potentially be used by headsets 142 in future digital reality situations allows for greater volumes of digital data to be processed and increasingly real virtual/augmented environments can be seamless maintained over time.

The intelligent utilization of assembly 144 resources and proactive generation of content that may, or may not, be employed in one or more alternate digital realities can provide efficient involvement of numerous separate headsets 142 a single VR assembly 144. However, it is noted that numerous separate VR assemblies 144 can be employed to provide separate, redundant, or concurrent translation of BVRC and PVRC into VRC for one or more digital environments for any number of users physically engaging at least interaction device 104. The ability to utilize assembly 144 resources efficiently to input, generate, and deliver content to maintain a digital environment and virtual/augmented reality can optimize the maintenance of a digital environment over time, but can struggle to incorporate motion of objects, users, and/or background landscapes. That is, despite the efficiencies provided by the proactive generation of VRC by a VR assembly 144, movement of objects and/or avatars can produce lag, delays, and/or glitches that jeopardize the realism and experience of the alternate reality.

Figure 6:
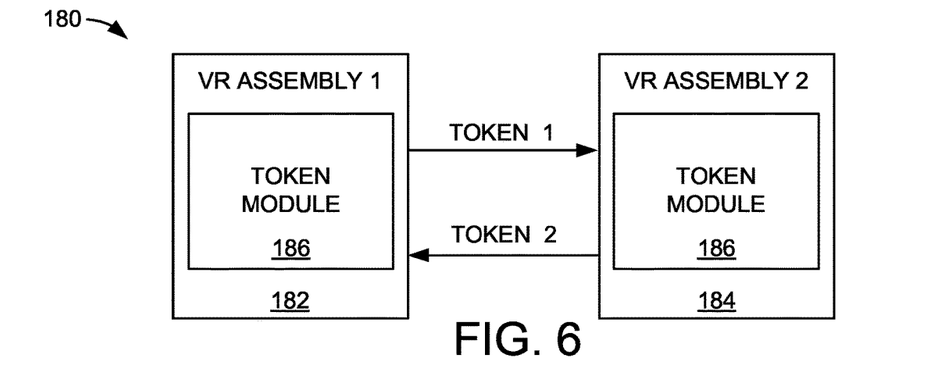
FIG. 6 displays a block representation of portions of an example data system configured in accordance with some embodiments.

Thus, various embodiments utilize token messages to make the incorporation of motion in a digital environment more efficient over time. FIG. 6 conveys a block representation of portions of an example alternate reality system 180 in which motion can be optimized through the use of assorted embodiments of token communications. As shown, a first VR assembly 182 can communicate with a second VR assembly 184 via one or more wired, or wireless, signal pathways that support the concurrent or sequential transfer of tokens (1 & 2) between token modules 186 of the respective assemblies 182/184.

A token can be characterized as a message that contains data describing action in a digital environment at a predetermined moment in time. While not required or limiting, a token module 186 can generate a token with at least an identification, frame index, length of video frames, and movement information, such as displacement velocity, and angle, for one or more moving users and/or objects within a digital environment. It is noted that every user of a digital environment to participate in a virtual/augmented reality has PVRC. In response to active motion of a user and/or an on object in a digital environment, a token module 186 can generate and dispense a token to any number of other VR assemblies or headsets participating in the alternate reality.

The transfer of a token may, in some embodiments, involve a communication software, or application, that is executed by a VR assembly 182/184 to convey tokens that provide motion information the enables generation of participant motion content (PMVRC). It is noted that an alternate reality object can be provided in base content (BVRC) and is not limited to a particular size, type, and duration, such as an animal, autonomous digital character, or inanimate article. In response to reception of a token, a token module 186 can identify what is moving from BVRC and store content in local data storage of the VR assembly 182/184. For instance, receipt of a token can prompt a token module 186 to identify objects from BVRC that can move in the digital environment and store images, video, and other digital content involving those objects in the local data storage device, which allows for efficient proactive generation of OVRC and OMVRC from the BVRC with respect to the various PVRC of the system.

By configuring a token with motion-specific information, instead of actual digital content or additional information about digital content, a token can be relatively lightweight and easily incorporated into a proactive motion content strategy. That is, a token module 186 can construct a token to contain only motion information that allows a VR assembly 182/184 to proactively generate motion content and/or reactively implement motion for digital objects, user avatars, and/or background features. In accordance with some embodiments, receipt of a token triggers a VR assembly 182/184 to assign an object ID to content contained in either BVRC or PVRC. The proactive identification of objects, avatars, and features that have the potential to move in a digital environment allows OVRC and OMVRC to be created when the processing resources of a system are conveniently utilized.

The distribution of tokens to numerous different headsets and VR assemblies 182/184 of a system allows respective assembly processors/controllers to engage a strategy that carries out the identification of moving aspects of a digital environment and generation of content associated with those aspects. For instance, a VR assembly 182 without the processing resources available to generate content for a reality maintained by the assembly 182 can task a different assembly 184 of the system 180 to utilize immediately available processing resources so that content can be efficiently created and available for implementation into the headset(s) maintained by the first VR assembly 182. Through the process of distributing tasks to other VR assemblies of a system, processing resources can be level-loaded so that one or more digital environments and realities can be seamlessly maintained despite motion in a highly realistic virtual/augmented environment. It is contemplated that motion digital content, regardless of the VR assembly creating the content, is moved to the local data storage device of the VR assembly carrying out the motion and maintaining a digital reality, which ensures minimal delay or lag that could occur if motion content was loaded only from data storage of the VR assembly that created the content.

Figure 7:
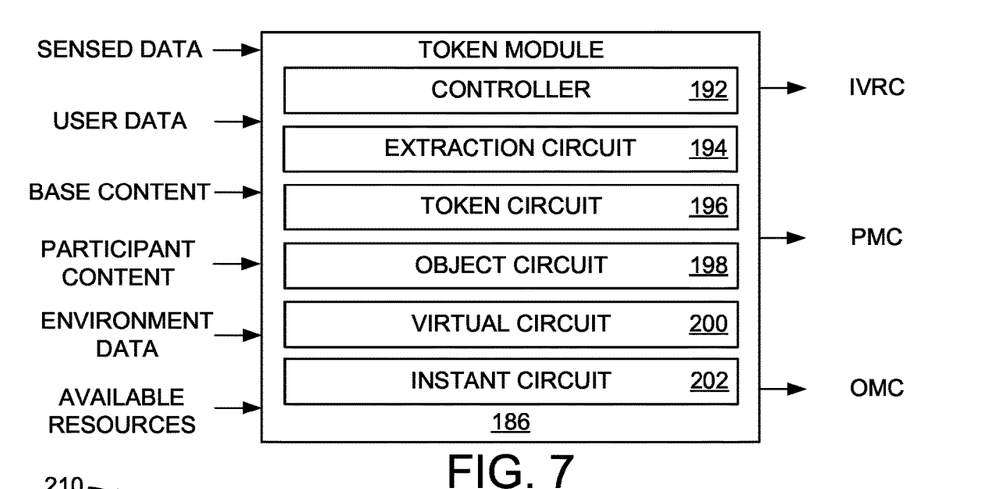
FIG. 7 displays a block representation of portions of an example data system employed in accordance with various embodiments FIG. 8 displays a block representation of portions of an example data system executing assorted embodiments of a data system for an alternate reality environment.

FIG. 7 depicts a block representation of an example token module 186 that can be utilized by a VR assembly in accordance with assorted embodiments to optimize the handling of motion in a virtual/augmented reality. It is noted that the token module 186 may be resident as hardware and/or software in any aspects of an alternate reality system, such as in a centralized network server, in a VR assembly not being utilized to support a headset, or in a VR assembly maintaining an alternate digital reality for multiple headsets. It is contemplated that portions of the token module 186 are physically positioned in different components of a data system, such as different VR assemblies, headsets, and/or network nodes, while acting in concert to provide intelligent data handling, digital content creation, token generation, and token usage.

A token module 186 can employ one or more controllers 192, which may be a microprocessor or other programmable circuitry, that directs the input of various information, management of existing data, generation of new digital content, delivery of digital content, and adapting an alternate digital reality over time through the outputting of images, video, graphics, and/or other content associated with instant virtual reality content (IVRC), OMVRC, and PMVRC to one or more connected headsets. While not required, IVRC can be created by merging VRC, PMVRC, and OMVRC aspects in response to information sent via token that indicates how a user/headset is physically moving to produce changes in an alternate digital environment.

The module controller 192 can act alone, or in conjunction with, other module circuitry that can carry out designated functions to alleviate the processing burden on the controller 192 to free module 186 bandwidth for new operations. An extraction circuit 194 can aid in creating OVRC from base content downloaded from one or more content providers as BVRC. The extraction circuit 194 can parse base digital content from multiple different providers to identify and correlate digital content associated with one or more objects. For instance, the extraction circuit 194 can initially label various digital aspects of BVRC and then separate the aspects into images, video, graphics, and other content types by identified objects, which allows the module controller 192 to translate base digital content into a dynamic alternate reality with realism and seamless motion.

The token module 186 can employ a token circuit 196 to direct the generation, communication, and utilization of tokens between headsets and/or VR assemblies of a data system maintaining one or more alternate digital realities. The token circuit 196 can execute and manage a dedicated communication software that provides secure, potentially encrypted, transfer of tokens between headsets and/or VR assemblies of a data system. Embodiments of the token circuit 196 create tokens from sensed, detected, or predicted actions of a user via a headset. It is contemplated that the token circuit 196 translates information from a headset, such as sensed acceleration, velocity, direction, and elevation, into a communicable token message where movement information is parsed into concise object identification and motion that can be seamlessly integrated into existing digital environments. That is, the token circuit 196 can translate raw data from a headset pertaining to movement of a user and/or digital object into a transferable message that is lightweight for transmission and efficiently interpreted into digital motion by the token module 186.

While the token circuit 196 can engage in any, and all, activity involving the generation, transfer, and utilization of tokens by a VR assembly, an object circuit 198 of the token module 186 can undertake translating the information of a token into the generation of digital motion content, either proactively or reactively. The object circuit 198 may also proactively identify various digital objects that can be changed over time with movement and/or interaction of a user. Some embodiments of the object circuit 198 classify digital content to the module controller 192 by type, length, size, orientation, and/or source. Such classifying of digital content allows for efficient extraction of content from base and/or participant data (BVRC/PVRC) to create object OVRC.

The object circuit 198 may further direct the generation of OMVRC based on movement information conveyed by through the token circuit 196. It is noted that the identification of object classifications, position, and motion over time allows the token module 186 to conduct efficient proactive and reactive digital content adaptations that provide seamless, realistic interactions between one or more users/headsets and an alternate digital environment. A virtual circuit 200 can complement the identification and classification of objects by the object circuit 198 to generate VRC and IVRC from BVRC and PVRC. The storage of content merged by the virtual circuit 200 into VRC and IVRC in local data storage device of a VR assembly allows for optimal utilization of available system processing and memory resources to integrate multiple moving objects and/or users into a single alternate digital reality.

It is contemplated that the virtual circuit 200 is employed to proactively create merged digital content, such as content combining multiple different users with objects and background images, video, graphics, and textures, while an instant circuit 202 of the token module 196 is tasked with implementing actual motion into comprehensive digital content to create IVRC. The utilization of the instant circuit 202 to merge token motion information to create comprehensive digital environment movement of objects, background, and/or users while the virtual circuit 200 creates static, but comprehensive, digital environment content provides efficient utilization of module 186 resources to be able to incorporate numerous different users, and headsets, into a single alternate reality with minimal lag, delay, and realism degradation.

Figure 8:
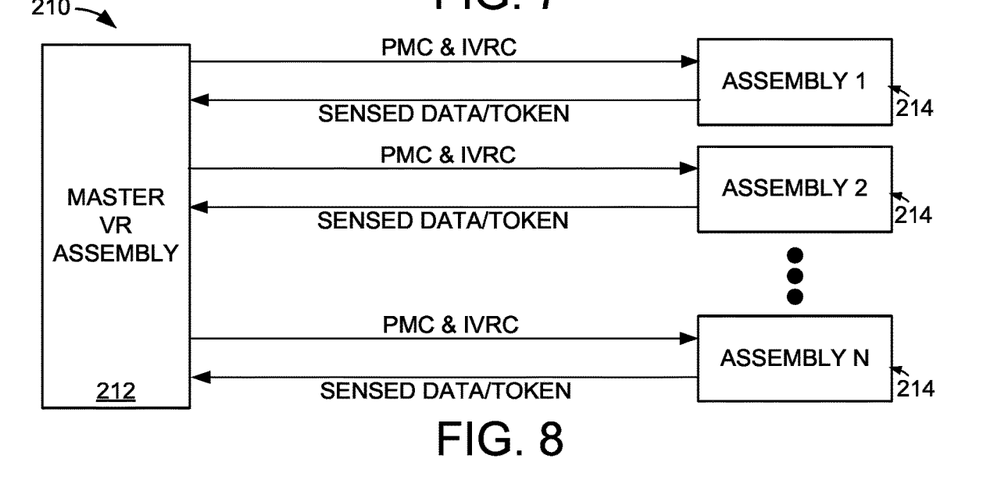

In FIG. 8, a block representation of portions of an example data system 210 depict how execution of assorted embodiments can provide optimized implementation of multiple users into an alternate digital reality. Initially, it is noted that any portion of a data system 210, such as a network controller, token module controller 192, or remote host, can provide primary processing and/or memory capabilities for digital environment display and management in numerous connected headsets, which may be connected via secondary VR assemblies that act to execute digital content without creating new digital content. That is, some embodiments utilize a primary, or master, system component to conduct processing intensive actions, such as content creation, content merging, and motion implementation, while secondary system 210 components carry out the display of digital content without altering, creating, or merging content, which preserves the secondary components processing capabilities to manage the various connected headsets.

The characterization of a VR assembly as a master or secondary component is not limiting and can change over time in response to system actions, such as newly connected headsets, newly connected VR assemblies, user movement, or software updates. For instance, a VR assembly can be assigned master component control until processing capabilities are greater in a different system component, which prompts demotion of the master component control to secondary control to a newly assigned master component. It is contemplated that a system 210 can have concurrent master components that conduct exclusive, or redundant, activities, such as token management, content downloading, content merging, content creation, and content delivery. Embodiments of a VR assembly assigned a secondary component designation is not limited to a particular set of capabilities and/or operations, which allows for dynamic actions, such as management of tokens, collection of sensor data, or implementing motion information.

In the example embodiment shown in FIG. 8, a single master VR assembly 212 communicates with several different secondary VR assemblies 214 to execute and maintain one or more alternate digital realities. It is noted that each VR assembly 212/214 can connect to one or more headsets, or interaction devices, to engage in two-way interaction, such as sensed movement from a user and display of an immersive digital environment. While not required or limiting, the master VR assembly 212 can conduct the gathering of external content, such as PVRC and BVRC, and generation of IVRC, OVRC, VRC, and OMVRC, which is selectively sent to secondary VR assemblies 214, as shown, for immediate, or future, use in maintaining one or more immersive digital environments for connected headsets/users.

The master VR assembly 212 can respond to sensed user movement by adapting the content and/or duties assigned to the respective secondary assemblies 214. For instance, the master assembly 212 can initially pass content merging duties to a secondary assembly 214 until an operational trigger, such as user movement or new BVRC being available for download, prompts the master assembly 212 to reduce the processing and/or memory duties of the secondary assembly 214 to only compile content into an immersive digital reality conveyed to a user via an interaction device, such as a headset. As such, the master VR assembly 212 can selectively distribute content and designate processing operations to downstream VR assemblies 214 to optimally utilize available resources, such as processing, buffer, memory, and channel bandwidths.

Through the intelligent allocation of system resources to conduct assorted content and token processing, IVRC is created, distributed, and executed with the least degradation of overall system 210 processing, memory, and buffer resources. The ability to segregate token processing among various VR assemblies 212/214 further optimizes the utilization of system 210 resources to allow greater volumes of data, and increased realism for a digital environment, compared to VR assemblies that solely conduct user movement and digital content adaptation processing. The use of a master VR assembly 212 to direct system operations on secondary VR assemblies 214 further allows for intelligent local storage of content, which may be in different assemblies 212/214 than were content was created or downloaded.

The utilization of master 212 and secondary 214 VR assembly roles, in some embodiments, optimizes the incorporation of multiple separate users/headsets into a single alternate reality. That is, the removal of at least some processing duties of secondary VR assemblies 214 in favor of the master VR assembly 212 allows processing to be more heavily focused on the integration of digital content to adapt an immersive alternate reality to movement of users, objects, and background features. In other words, undertaking processing intensive operations, such as content merging, extraction, and generation, with a master assembly 212 allows downstream secondary assemblies 214 to dedicate processing and data storage resources to responding to operational triggers by distributing changing digital content into a reality without degrading timing, color, realism, texture, or depth of field.

Regardless of whether a VR assembly is assigned a master 212 or secondary 214 role in the system 210, the generation and communication of tokens can provide efficient and robust identification and implementation of user movements into digital form. More specifically, communication of a lightweight token message, compared to a comprehensive message involving several different digital reality aspects, allows a VR assembly to efficiently translate OVRC, BVRC, VRC, and PVRC into OMVRC, IVRC, and PMVRC with minimal processing overhead, which enables a VR assembly to concurrently translate movement of multiple different users and/or objects into realistic, seamless digital reality. The use of intelligently generated and utilized tokens may further allow for efficient interaction between users of an alternate reality.

Figure 9:
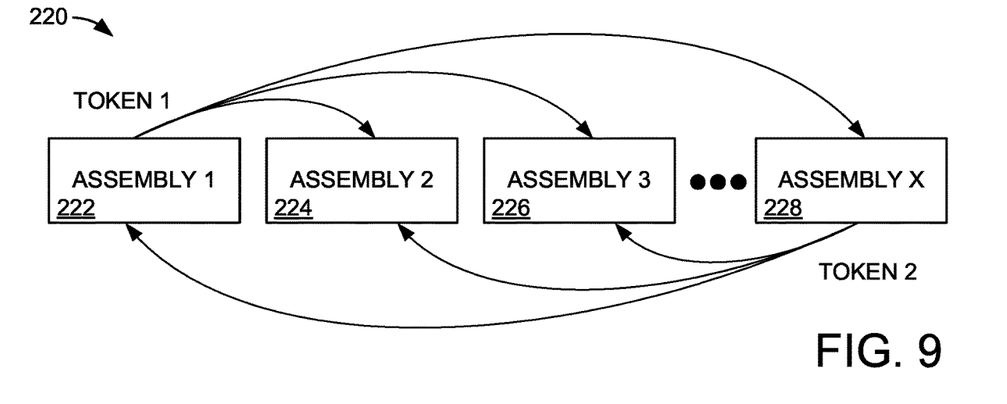
FIG. 9 displays a block representation of portions of an example data system carrying out embodiments to optimize an alternate reality environment.

FIG. 9 depicts a block representation of portions of an example data system 220 that can maintain one or more alternate digital realities in accordance with various embodiments. As illustrated, a plurality of separate VR assemblies can communicate separate tokens to each of the other assemblies of the system 220. Such broadcasting of tokens to each other VR assembly participating in the system 220 can minimize data volumes being transferred by simply containing user/object identification, frame index, length, and movement information, such as displacement, velocity, and view angle. Hence, the transfer of tokens with minimal data, instead of broadcasting digital content to each VR assembly of the system 220, maximizes data transferring performance as recipient VR assemblies read and/or create VRC and/or IVRC from local storage in response to token notification of movement.

The non-limiting example system 220 of FIG. 9 conveys how a first VR assembly 222 can create a token (token 1) responsive to detected, or predicted, movement of a connected user and distributed that token to each other assembly 224/226/228 of the system 220. Meanwhile, a second token (token 2) is generated by a different system VR assembly 228 and is distributed to each other assembly 222/224/226 of the system 220. It is contemplated that a single assembly can be connected to, and respond to movement of, multiple separate headsets, but such configuration is not required as an assembly can respond to a single headset/user.

With the broadcasting of created tokens to each VR assembly of the system 220, the relatively lightweight data payload of a token can be utilized to convey non-movement information to other users. For instance, a token can convey movement and non-movement information to other system assemblies that allows each assembly 222/224/226/228 to maintain a uniform digital environment that accurately conveys user movement while communicating user interactions, such as emotions, text, audio, tactile response, and colors. The ability to piggyback communication of non-movement interactions in a token providing user/object movement information is an efficient manner of communicating among different users without incorporating processing and/or memory resources to conduct a separate interaction protocol and signal pathway, such as with a dedicated messaging platform and software.

Figure 10:
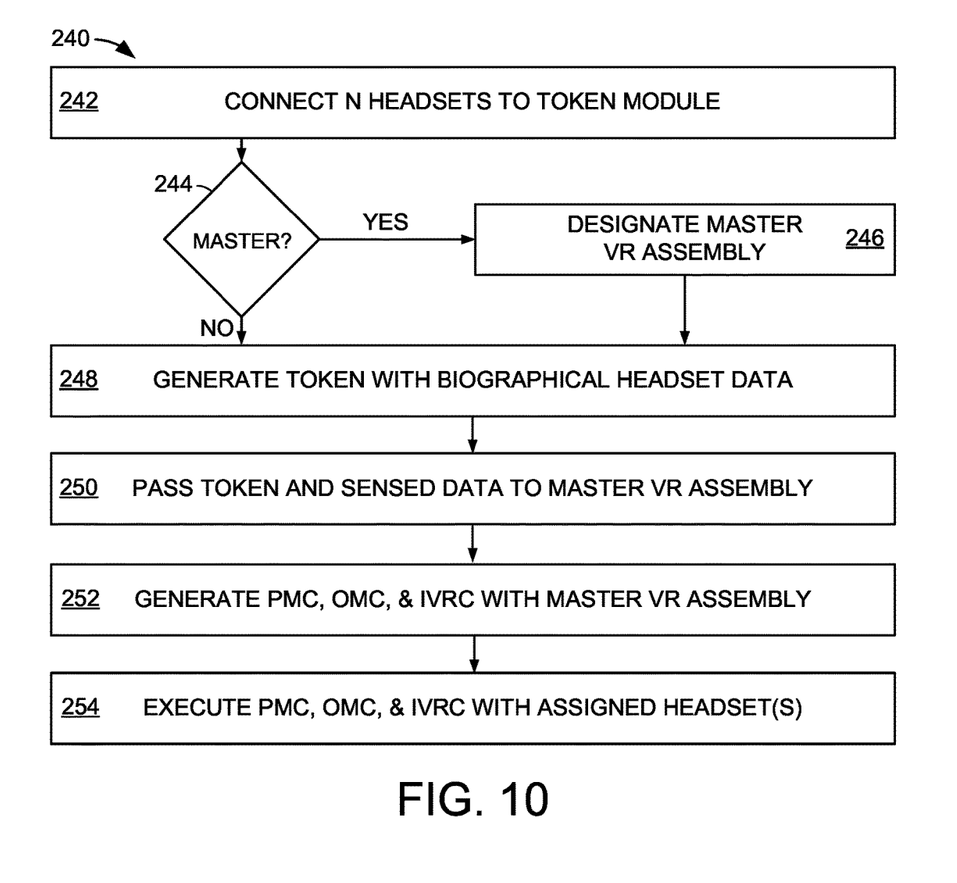
FIG. 10 is an example token communication routine that can be executed as part of a data system to optimize an alternate reality environment.

FIG. 10 conveys an example data system operational routine 240 that can be carried out with the various embodiments of FIGS. 1-9. The routine 240 begins with step 242 connecting a number (N) of headsets to one or more token modules. It is contemplated that multiple headsets are connected to a single VR assembly employing a token module, multiple VR assemblies each have token modules, or a token module of a VR assembly controls multiple headsets connected to other VR assemblies.

The connection of multiple VR assemblies allows the opportunity to designate master and secondary duties. Decision 244 evaluates if multiple VR assemblies and/or token modules are present and if master/secondary roles would provide optimized system operation to maintain an alternate digital reality for the assorted connected users/headsets. If so, step 246 designates at least one master VR assembly and assigns master duties, such as token, content creation, data storage, or content implementation control.

With a master component in place, or in the event no master is assigned from decision 244, step 248 proceeds to generate at least one token consisting of biographical headset data in response to headset/user movement and/or interaction. For instance, step 248 can react to a user speaking, selecting, and/or physically moving by generating a token with simple movement information that can be efficiently interpreted by other system VR assemblies/token modules into changes to a digital environment. It is noted that creation of a token in step 248 can involve parsing non-essential movement information, such as force, pressure, duration, and source, to create a lightweight token that is easily translated into adapted aspects of an alternate reality. That is, a token can selectively contain less than all the available data/information collected by a headset due to the token module parsing information deemed non-essential to implementing changes to a digital environment to accurately reflect the user's movement and/or interaction.

A generated token is then passed, in step 250, to other VR assemblies of a system, which may, or may not, include a master VR assembly. The broadcasting of a token in step 250 prompts other, non-generating VR assemblies, such as, but not limited to, a master VR assembly to access locally stored digital content and create at least PMVRC, OMVRC, and IVRC in step 252. That is, step 252 creates digital content locally from information of a broadcast token instead of transmitting digital environment content, which saves system bandwidth and processing overhead. The use of a master assembly to generate digital content can provide alternative optimization of processing resources that allows secondary VR assemblies to simply execute new digital content in step 254 without expending processing resources.

However, in systems that do not employ an assigned master VR assembly, step 254 involves efficiently executing content generated in step 252 with selected headsets to convey user/object changes over time with maximum possible realism and timing. The use of tokens in routine 240 can be particularly effective in data systems where multiple headsets are concurrently used to incorporate different users into a single alternate reality. By intelligently segregating the detection of user/object motion from creation of digital content reflecting such motion, a data system can optimize the processing capabilities of the various constituent VR assemblies and token modules to maintain a digital environment with realism and minimal lag, which can be particularly advantageous in gaming and social applications where numerous different users often move and interact in a single common digital environment.

Figure 11:
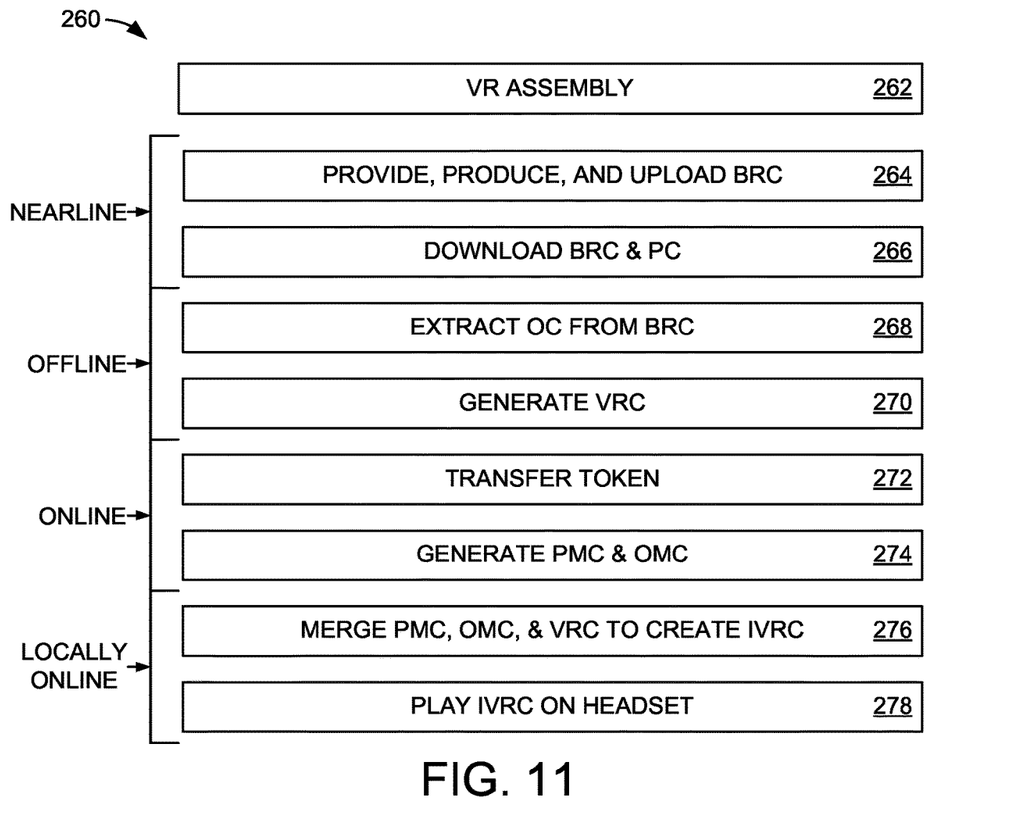
FIG. 11 depicts a representation of portions of an example data system utilized to carry out some embodiments for an alternate reality environment.

FIG. 11 depicts a block representation of operational aspects of an example data system 260 employed in accordance with assorted embodiments. A VR assembly 262 can be operated to conduct a diverse variety of workflows that proactively and/or reactively sense user motion, generate tokens, create digital content, and store data to maintain a digital environment with multiple separate users engaging a single alternate reality. It is contemplated that a data system 260 consists of several VR assemblies 262 that concurrently and/or redundantly operate to manage data and digital content to produce an immersive alternate reality with realistic motion and interaction for assorted users.

While not required or limiting, a VR assembly 262 can selectively conduct any number and series of operations. For example, the VR assembly 262 can provide, produce, and upload BVRC to other components of the data system 260 in operation 264. The VR assembly 262 can also download any volume of BVRC and/or PVRC from other components of the system 260 in operation 266 and store such content in local data storage for later use. The uploading and or downloading of content in operations 264 and 266 can be conducted nearline, in some embodiments, which can be characterized as storing data in local non-volatile data storage that is not immediately available, but is quickly accessible upon online connection without host manipulation of the stored data.

A VR assembly 262 can conduct various operations while offline, which can be characterized as not connected to any remote system 260 component. For instance, OVRC can be extracted in operation 268 from BVRC in an offline state just as assorted VRC can be generated in operation 270 by merging downloaded PVRC from system users/participants with BVRC. The generation of VRC can be defined as creating comprehensive digital content that incorporates aspects of the assorted system users, such as avatar appearance, graphics, videos, and textures, with background content. Some embodiments of operation 270 proactively generates numerous different comprehensive content to provide efficient implementation into a digital environment upon one or more operational triggers, such as user movement, user activation, user interaction, and background environment motion.

The intelligent utilization of an offline state for a VR system 262 can allow for efficient online behavior that optimizes resource execution, such as processing, memory, and buffer resources. An online state for the VR system 262 can involve the generation and transfer of one or more tokens in operation 272. Such tokens can consist of sub-tasks performed by the VR system 262 that parses sensed user information, such as movement and interaction, into a lightweight message that is broadcast to other VR systems and/or headsets of the system 260. Outputting tokens can occur concurrently or sequentially with the input of tokens generated by other VR assemblies of the system 260. Receipt of tokens indicating motion of other users of an alternate reality can prompt the VR assembly 262 to generate motion digital content, such as PMVRC and OMVRC, in operation 274. Such movement-specific content can be stored in one or more local data storage repositories, like solid-state memory and/or rotating magnetic media.

While the VR assembly 262 can compile assorted comprehensive digital content that is static in an offline state, various embodiments create dynamic comprehensive digital content in operation 276 based on motion information from tokens and/or previously constructed PMVRC and OMVRC resident in local data storage. The creation of dynamic comprehensive digital content can merge, in some embodiments, the motion digital content that is specific to each system user (PMVRC) with one or more object-specific content (OMVRC) and static comprehensive content (VRC) to form instant digital content (IVRC) that is then played on one or more headsets in operation 278 to convey an immersive, dynamic, and responsive alternate reality. It is noted that the merging of content and execution of IVRC can be done in an offline state with a single VR assembly 262, but alternatively can be conducted with the VR assembly 262 in an online state with local processing of each system VR assembly employed to execute digital content involving motion.

Through the execution of the assorted operations shown in FIG. 11, a data system 260 can be optimized to incorporate multiple separate users into a single (shared) immersive alternate reality, which can be a completely virtual reality or an augmented reality. An example alternate reality environment 280 is depicted as a block representation in FIG. 12 to illustrate how separate users 282 can utilize VR assemblies to participate in a single, immersive digital world. Although not limiting, the example environment 280 is a conference room where respective users 282 are positioned around a central feature 284, such as a table, hologram, or monitor.

Figure 12:
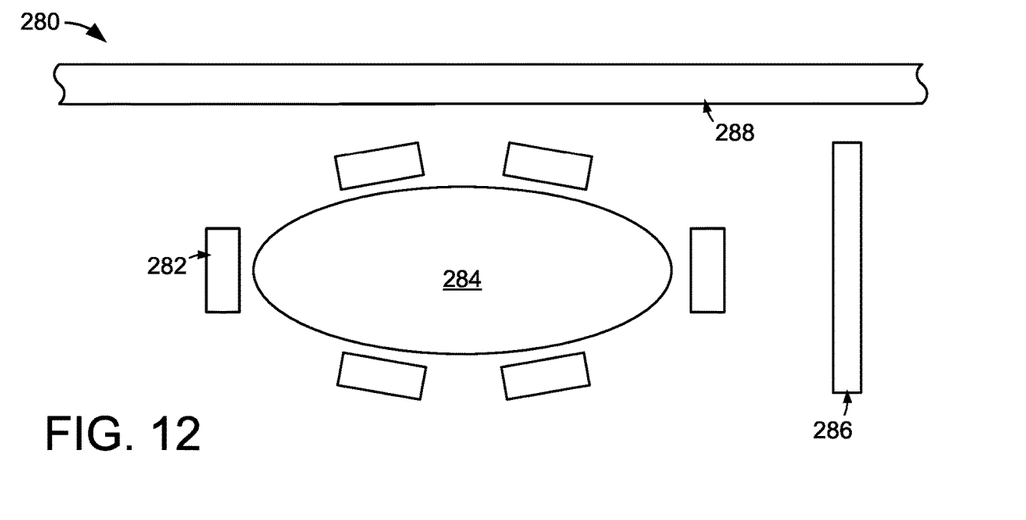
FIG. 12 illustrates portions of an example alternate reality arranged and operated in accordance with various embodiments.

The conference room may additionally consist of one or more dynamic features 286, such as a workspace, whiteboard, or monitor that conveys information to the collection of users 282. It is contemplated that various background content 288 can be conveyed to the users 282 with static, or dynamic, aspects. For instance, the background content 288 can be scenery with moving animals, foliage, or people. Another example of background content 288 involves a presentation of information, graphics, video, or pictures that changes over time and/or in response to activation by a controlling user 282.

It is noted that social realities that are intended for multiple users to interact may be the next generation platform to utilize mobile computing devices, such as smartphones and tablets. The evolution of social media profiles, and data collection, appears to be toward completely digital environments for users to immerse themselves and interact with the environment and others. The generation and maintenance of such environments is possible, but corresponds with tremendously large volumes of data and digital content processing. As a result, a large group of people using a single alternate reality can cause technical limitations due to data transfer speed, cost of content, and processing capabilities.

Accordingly, embodiments are directed to VR assemblies with local data storage that is intelligently utilized to mitigate digital environment realism degradation. Storing BVRC in local VR assembly data storage proactively allows for efficient utilization. The ability to locally store digital content associated with a user/participant (PVRC) further allows for efficient utilization by itself, or to derive other digital content, such as static (VRC) and dynamic (IVRC) combinations of BVRC and PVRC. The decentralization of data and localization in VR assemblies allows available computing resources to be employed to provide optimal maintenance of an alternate reality over time.

Some embodiments of a VR assembly employ a communication software that allows for the integration of a user's voice and physical movements into messages that enable efficient digital representations of the motion and interaction between users. It is contemplated, but not required, that BVRC is a movie or clip that can be downloaded from a remote content provider to local data storage just as participant content is stored in local data storage. The local storage of digital content allows the VR assembly to extract image frames from BVRC and merge the content with aspects of one or more PVRC to proactively create a comprehensive digital content (VRC) that is stored in local data storage. The ability to create VRC offline and disconnected from a network allows a VR assembly to reduce network traffic and the stress of system resources during peak data flowrates.

A token can be a message sent between VR assemblies to interact with other users of an alternate reality. While not limiting, a token can consist of a user or object identification along with a frame index, number of frames, user displacement, moving velocity, and view angle. Such a token can be created by a VR assembly by discarding some sensed information, such as detected user data, environmental data, or data corresponding to non-moving aspects of a user.

Each user of an alternate reality can, in some embodiments, have unique digital data corresponding with the user, such as an appearance, voice, movements, and size. When a user has active motion, a VR assembly creates and broadcasts a token message that allows the VR assemblies to generate PMVRC. Meanwhile, various background objects, such as a rock, boat, animal, or ball, can be identified by a VR assembly and proactively extracted from BVRC to create static (OVRC) and dynamic (OMVRC) with the information contained in a token.

An example data system can have a single VR assembly controlling the content displayed on multiple headsets. The use of sensors in the assorted headsets of a data system can sense a range of activity, such as head, arm, leg, hand, and foot motion, allows a VR assembly to generate tokens with information that accurately conveys movement in the digital environment. For instance, sensed information transferred via a token can allow a VR assembly to generate PVRC and PMVRC as well as IVRC from the merging of VRC, OMVRC, and PMVRC. The transferring of a token with motion information to allow local generation of digital content, instead of centrally generating content and distributing such content to constituent headsets, greatly reduces bandwidth restrictions and maximizes data transferring performance.

When a VR assembly access digital content stored in local data storage, such as VRC, PVRC, or OVRC, instead of having to download the content, a token can efficiently be transformed into IVRC, PMVRC, and OMVRC. The ability to perform various aspects of digital content creation and execution nearline, offline, online, and locally online provides VR assemblies the ability to intelligently utilize available computing resources to maintain an alternate reality with multiple users and motion over time.

Even though numerous characteristics and advantages of the various embodiments of the present disclosure have been set forth in the foregoing description, together with details of the structure and function of various embodiments of the disclosure, this detailed description is illustrative only, and changes may be made in detail, especially in matters of structure and arrangements of parts within the principles of the present disclosure to the full extent indicated by the broad general meaning of the terms in which the appended claims are expressed.

What is claimed is:

1. A method comprising:
    connecting an interaction device to a virtual reality (VR) assembly, the interaction device configured to be physically engaged by a human user and comprising a sensor configured to detect an input from the human user and a display element configured to convey an output to the human user, the VR assembly comprising a controller circuit and a local data storage device;
    downloading, from a remote source across a computer network, a base content to the local data storage device of the VR assembly;
    storing a user content to the local data storage of the VR assembly;
    proactively generating a first comprehensive content and an alternative, second comprehensive content using the controller circuit of the VR assembly, each of the first comprehensive content and the alternative, second comprehensive content comprising merged aspects of the base content and the user content based on predicted motion information associated with an object or a participant;
    storing the first comprehensive content and the alternative, second comprehensive content in the local data storage device;
    receiving a message token by the controller circuit comprising actual motion information associated with the object or the participant; and
    executing the first comprehensive content to create an immersive digital reality conveyed to the human user via the interaction device responsive to the message token, the immersive digital reality incorporating the motion information, the alternative, second comprehensive content unused in the immersive digital reality.

2. The method of claim 1, wherein the VR assembly is a first VR assembly, the interaction device is a first interaction device, the sensor is a first sensor and the human user is a first human user, and wherein the controller circuit of the first VR assembly receives the message token from a second VR assembly associated with a second human user via a second sensor of a second interaction device, the actual motion information associated with a movement action by the second human user, the immersive digital reality displayed to the first human user incorporating a digitally rendered movement action corresponding to the movement action by the second human user.

3. The method of claim 2, wherein the message token is a second message token from the second VR assembly, and wherein a first message token is previously transmitted to the second VR assembly by the first VR assembly to transmit actual motion information associated with a movement action by the first human user as sensed by the first sensor for display in a second digital immersive reality to the second human user via the second interaction device.

4. The method of claim 1, wherein the controller circuit of the VR assembly identifies the object from the base content, identifies the predicted motion information of the object as different first and second predicted motion information, generates the first comprehensive content in response to the first predicted motion information, and generates the second comprehensive content in response to the second predicted motion information.

5. The method of claim 4, wherein the user content is downloaded via the network to the VR assembly and comprises information associated with the human user.

6. A method comprising:
    connecting a first virtual reality (VR) assembly to a second VR assembly via a computer network, the first VR assembly connected to a first interaction device physically engaged by a first user, the second VR assembly connected to a second interaction device physically engaged by a second user;
    downloading, via the network from a remote source, a base content to each of a first local data storage device of the first VR assembly and a second local data storage device of the second VR assembly;
    storing a first user content associated with the first user to the local data storage of the first VR assembly and to the local data storage of the second VR assembly;
    storing a second user content associated with the second user to the local data storage of the second VR assembly and to the local data storage of the first VR assembly, each of the first user content and the second user content being unique digital representations of the respective first and second users;
    generating a first comprehensive content and an alternative second comprehensive content proactively with a first controller circuit of the first VR assembly, the first comprehensive content and the alternative second comprehensive content each comprising merged aspects of the base content, the first user content and the second user content from a point of view of the first user within a shared alternate immersive reality based on different predicted movements of an object, the first user or the second user in the shared immersive reality;
    generating a third comprehensive content and an alternative fourth comprehensive content proactively with a second controller circuit of the second VR assembly, the third comprehensive content comprising merged aspects of the base content, the first user content and the second user content from a point of view of the second user within the shared alternate immersive reality based on different predicted movements of an object, the first user or the second user in the shared immersive real;
    storing the first and second comprehensive content in the data storage device of the first VR assembly, the third and fourth comprehensive content in the data storage device of the second VR assembly, the generating and storing of the respective first, second, third and fourth comprehensive content taking place prior to execution of the shared alternate immersive reality; and
    subsequently executing the shared alternate immersive reality by retrieving and displaying the first comprehensive content to the first user via the first interaction device and concurrently retrieving and displaying the third comprehensive content to the second user via the second interaction device, the first and second VR assemblies exchanging message tokens each time movement is detected by the respective first and second users, the message tokens conveying actual movement information that is incorporated into the respective points of view of the first and second users within the shared alternate immersive reality without a transfer of displayed content across the network, the second and fourth comprehensive content not displayed during the execution of the shared alternate immersive reality responsive to non-detection of an input from either the first or second users corresponding to the predicted movements associated with the second and fourth comprehensive content.

7. The method of claim 6, wherein the object is extracted from the base content by first controller circuit of the first VR assembly or second controller circuit of the second VR assembly.

8. The method of claim 6, wherein the first VR assembly creates object motion digital content and user motion digital content from the base content and the first user content stored in first local data storage of the first VR assembly, the object motion digital content representing movement of an object in the shared alternate immersive reality, the user motion digital content representing movement of the first user in the shared alternate immersive reality.

9. The method of claim 6, wherein the first VR assembly schedules generation of the first and second comprehensive content at a first time, the second VR assembly schedules generation of the third and fourth comprehensive content proactively for a second time, the first time being different than the second time, the respective times based on the computing resources expected to be available for the respective first and second VR assemblies.

10. An apparatus comprising:
a local interaction device configured to be physically engaged by a human user, the interaction device comprising a sensor and a display element; and
a local virtual reality (VR) assembly coupled to the local interaction device and comprising a local controller circuit and a local non-volatile data storage device, the local controller circuit configured to:
receive, from a remote source across a network, base VR content and user VR content, the base VR content at least describing background features of a shared alternate immersive reality, the user VR content describing features of the human user;
extract at least one moveable object from the base VR content to generate potential motion information for alternative movements that may be subsequently imparted to the extracted at least one moveable object;
merge aspects of the base VR content, the user VR content and the potential motion information for the at least one moveable object to generate first comprehensive digital content and alternative second comprehensive digital content each associated with a different potential movement of the at least one moveable object;
store the first and second comprehensive digital content to the local non-volatile data storage device;
initiate execution of the shared alternate immersive reality during a multi-party VR session involving a plurality of other VR assemblies coupled to the local VR assembly and having associated human users;
sense a local movement action by the local human user via the sensor of the local interaction device;
generate and transmit a first message token to each of the plurality of other VR assemblies executing the shared alternate immersive reality, the first message token including movement information associated with the local movement action which is uniquely displayed within the shared alternate immersive reality with respect to each of the plurality of other VR assemblies;
receive and process a second message token forwarded from a selected one of the plurality of other VR assemblies, the second message token including movement information associated with a remote movement action by the associated human user of the selected one of the plurality of other VR assemblies;
receive and process a third message token that includes actual movement information corresponding to an actual motion of the at least one object; and
merge the movement information of the first message token, the second message token and the third message token with a selected one of the first or second comprehensive digital content to provide updated comprehensive digital content for display by the local display of the local interaction device to the local human user, the selected one of the first or second comprehensive digital content corresponding to the actual motion of the at least one object, the remaining one of the first or second comprehensive digital content remaining unused in the shared alternate immersive reality.

11. The apparatus of claim 10, wherein the first message token comprises a unique identification (ID) value associated with the local human user and does not include digital content to be displayed in the shared alternate immersive reality.

12. The apparatus of claim 10, wherein the local controller circuit extracts the at least one moveable object from the base VR content responsive to receipt of a third message token.

13. The apparatus of claim 10, wherein the local VR assembly operates as a master assembly so that the local controller circuit is further configured to offload content generation operations to at least a selected one of the plurality of other VR assemblies to level load a processing level.

14. The apparatus of claim 13, wherein the plurality of other VR assemblies are characterized as secondary assemblies including a first secondary assembly having a first human user and a second secondary assembly having a second human user, and wherein the master assembly engages in intelligent storage of content by directing the storage of selected content in a data storage device of the first secondary assembly for display to the second human user of the second secondary assembly.

* * * * *